Figure 1:
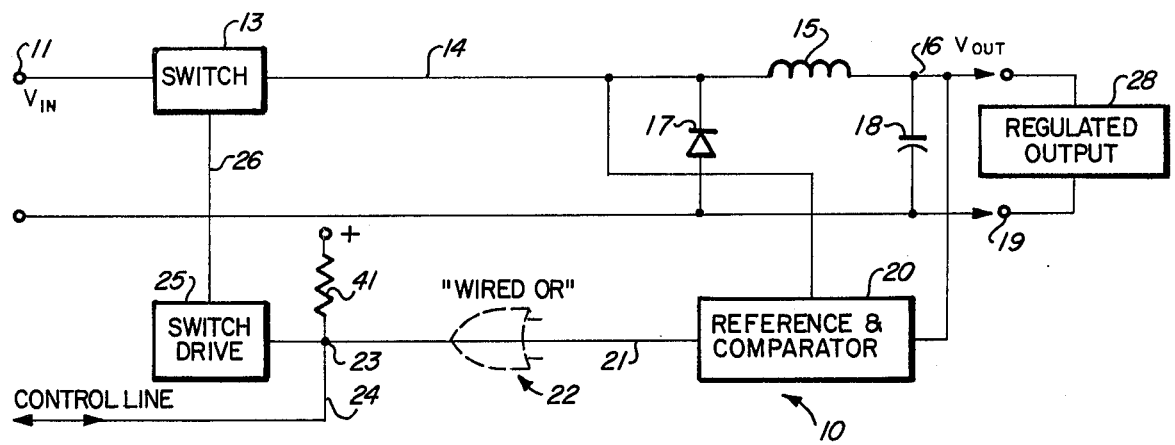

United States Patent [19]

Payne et al.

[11] 4,194,147

[45] Mar. 18, 1980

[54] PARALLEL CONNECTED SWITCHING REGULATOR SYSTEM

[75] Inventors: Francis L. Payne; Ernest E. Godsey, both of Tucson, Ariz.

[73] Assignee: Burr-Brown Research Corporation, Tucson, Ariz.

[21] Appl. No.: 857,089

[22] Filed: Dec. 5, 1977

[51] Int. Cl.² ............................................. G05F 1/40
[52] U.S. Cl. .................................. 323/17; 323/22 T; 307/53
[58] Field of Search ............... 323/23, 25, 17, DIG. 1; 307/44, 52, 53, 62, 82, 242, 297

[56] References Cited

U.S. PATENT DOCUMENTS

| 3,521,150 | 7/1970 | Bates ...................................... 323/25 |
| 3,824,450 | 7/1974 | Johnson et al. ......................... 323/23 |
| 4,041,367 | 8/1977 | Gold et al. ..................... 323/DIG. 1 |
| 4,042,856 | 8/1977 | Steigerwald .................... 323/DIG. 1 |
| 4,074,182 | 2/1978 | Weischedel ............................ 307/82 |

OTHER PUBLICATIONS

*The TTL Data Book For Design Engrs*, Texas Instruments, 2nd Ed., 1976, pp. 6–25.

Primary Examiner—William M. Shoop
Attorney, Agent, or Firm—Cahill, Sutton & Thomas

[57] ABSTRACT

A switching regulator system and method for producing regulated output voltage and current in response to an unregulated input voltage, including a plurality of switching regulators connected in parallel and control circuitry to accomplish uniform loading of each of the switching regulators according to the rated current producing capacity of each regulator. The switching regulators each include a switching transistor, an inductor responsive to the switching transistor, a free-wheeling diode responsive to the inductor, and a comparator for providing an output signal representative of whether the regulated output voltage exceeds a threshold. The control circuitry poroduces a control signal repesentative of the logical OR of the comparator output signals. Each of the indivdual switching regulators includes buffer circuit responsive to the control signal and coupled to the base electrodes of the respective switching transistors for turning all of the switching transistors on and off substantially simultaneously in response to the control signal. The individual switching regulators thereby supply the output current of the switching regulator system proportinately to the designed current producing capacities of the individual regulators. For identical switching regulators, each will supply an equal current to the load. For circuits with unequal design capacities the switching transistors have equal duty cycles, thereby proportioning the load current from each regulator according to its designed current producing capacity.

21 Claims, 3 Drawing Figures

PARALLEL CONNECTED SWITCHING REGULATOR SYSTEM

BACKGROUND OF THE INVENTION

The invention relates to switching regulators and combinations of switching regulators coupled in parallel.

DESCRIPTION OF THE PRIOR ART

It is well known that the reliability and lifetime of semiconductor devices is an inverse function of temperature at which the semiconductor devices are operated. It is therefore important that system including a large number of semiconductor devices have relatively uniform power dissipation therein to avoid excessive heating of particular transistors, since the reliability of the entire system is no greater than that of its least reliable component. It is frequently necessary to have a power supply which provides a larger output current than can be supplied by any available individual power supplies. It is common practice to couple low current power supplies in parallel to obtain the larger output current. However if the load current is not uniformly shared by the parallel-coupled power supplies, each according to their design capacity, one of them may dissipate far more power (in terms of its designed current producing capacity) than the others, and will consequently operate at a much higher temperature; thus, the reliability of that power supply will be substantially reduced. Further, if that power supply fails, the load on the remaining regulators connected in parallel is suddenly increased, thereby raising their temperatures. A chain reaction of reliability failures may be thus set off by the non-uniform power dissipation in the parallel-connected power supplies. Another mode of system failure results from the remaining parallel-connected power supplies being unable to produce the required load current. This condition is likely to occur, and if it does, the required regulated output voltage can not be maintained. This situation may in turn lead to malfunctions of electronic equipment which is powered by the parallel connected power supplies.

Power supplies of a type referred to as analog or linear regulators are commonly manufactured in modular form, each module having a limited current supplying capability. Consequently, it is common practice to connect such modular power supplies in parallel when there is a need for a power supply current exceeding the current rating available modular supply units. In order to successfully operate such modular power supplies when they are connected in one common parallel configuration, it is necessary to adjust the individuals power supplies so that all of them except one operate in a "current limit" mode. A power supply in the "current limit" mode is adjusted to deliver a constant output current; however, its output voltage assumes whatever voltage is necessary to deliver that constant current to a load connected to the output terminals of the power supply. The remaining parallel-connected power supply is adjusted to operate at the desired constant output voltage level, which should be below the current limit of that power supply. The voltage-determining power supply produces an amount of current equal to the difference between the required load current and the amount of current produced by the other parallel-connected power supplies. Unfortunately, power dissipation is not uniform for modular power supplies operated in this fashion. This causes the various parallel-connected units to operate at various temperatures, leading to the above-mentioned reliability problems. Further, if the current required by the load increases sharply, the voltage determining regulator may go into its "current limit" mode. This will cause the output voltage to drop, possibly causing malfunctions in electronic equipment dependent upon the above constant output voltage level. Further, expansion of a system of such analog power supplies by adding one or more additional analog power supply modules in parallel requires one or more readjustments of the modules already in the system.

More complex modes of operating two or more power supplies in parallel to produce uniform output currents (and therefore uniform power dissipation and uniform operating temperatures) in each of the parallel power supplies have been realized. These approaches involve a number of interconnections between the parallel-connected power supplies; they also involve the use of additional circuitry, including current sensing resistors, voltage input differential amplifier circuitry, error amplifier circuitry, and reference regulator circuitry to accomplish the uniform output currents. Consequently, the circuitry required for these techniques is expensive. They further require that manual adjustments be made to each of the power supplies to ensure that each such power supply operates outside of its "current limit" mode. Further, the analog control signals which are transmitted between the parallel connected power supplies and associated control circuitry to effect the uniform output currents are quite sensitive to noise which may upset operation of the power supply system. These methods are costly and inconvenient approaches to solving the above problems.

Another category of power supplies referred to as switching regulators, operate in such a manner that their power conversion efficiency is greatly improved over that of linear regulators. Switching regulators are commonly utilized in applications where a substantial "ripple" voltage is acceptable in the output voltage and where certain levels of EMI (electro magnetic interference) are tolerable. For a more detailed description of switching regulators, see "The Voltage Regulator Applications Handbook", March, 1974, by the Applications Staff of Fairchild Semiconductor Corporation; also see "Switching Regulator Design Guide", publication No. U-68A, 1974, by Unitrode Corporation.

The state of the art of power supplies and connections thereof is generally indicated by U.S. Pat. Nos. 3,600,667; 3,521,150; 3,466,455; 3,356,855; 3,675,114; 3,824,450; 4,016,461; 3,737,756; 3,984,799; and 4,017,745.

SUMMARY OF THE INVENTION

Accordingly, it is an object of the invention to provide inexpensive circuitry to accomplish parallel interconnection of voltage regulator circuits so as to obtain proportionate loading of each regulator according to its current producing capacity.

It is another object of the invention to provide a modular power supply system wherein the load is automatically uniformly redistributed among individual power supply modules according to their respective current producing capacities as additional power supply modules are connected to the modular power supply system to increase the output current thereof.

It is another object of the invention to provide a switching regulator which may be connected in parallel with other switching regulators such that the load is automatically uniformally shared between the switching regulators each according to its design or rated power output capacity.

Briefly described, and in accordance with one embodiment of the invention, circuitry and method are provided for operating a plurality of parallel-connected switching regulators to provide uniform loading of the switching regulators according to the current producing capacity of each. Each of the switching regulators includes a switching transistor, an inductive device responsive to the switching transistor for supplying current to an output of the switching regulator system, a free-wheeling diode responsive to the inductive device, and a comparator circuit responsive to the regulated output voltage for providing an output signal representative of whether the regulated output voltage exceeds the comparator threshold. The switching regulator system includes control circuitry responsive to the output of each of the comparators for producing a control signal representative of the logical NOR function of the comparator output signals of the comparator circuits. Each of the switching regulators includes buffer circuitry coupled to the control circuitry to drive the base electrode of the switching transistor of that switching regulator. All of the switching transistors are consequently turned on and off at substantially the same time in response to the control signal, thereby producing substantially uniform duty cycles in the current switching devices of the switching regulators. In one embodiment of the invention the control circuitry includes an open collector inverter located in each of the individual switching regulators. The input of each open collector inverter is connected to the output of the comparator circuit of that switching regulator, and the open-collector output is connected to a control conductor. The control conductor is connected to a charging device which produces a predetermined voltage on the control conductor when all of the open collector inverters present an open collector impedance of the control conductor. The control conductor is connected to the inputs of all of the buffer circuits to effect simultaneous turning on and turning off of the switching transistors in response to the control signal.

In accord with another embodiment of the invention, a switching regulator is provided which is readily connectable in parallel configuration with other switching regulators having similar control features. The switching regulator includes a switching transistor having its collector connected to receive an unregulated input voltage. The emitter of the switching transistor is coupled to one terminal of an inductor. Another terminal of the inductor is coupled to the output of the switching regulator. An output capacitor is also coupled to the output, and cooperates with the inductor to produce an integrated output voltage at the output. A comparator circuit responsive to the regulated output voltage produces a first and second voltage levels indicative of whether the regulated output voltage exceeds a predetermined threshold. The predetermined threshold is determined by the voltage of the emitter of the switching transistor. The comparator circuit output is connected to the input of a control circuit which presents a high output impedance or a low output impedance, in response to the comparator output voltage levels. Consequently, the output of the control circuit may be "wire ORed" with the output of the control circuit of another like switching regulator. The output of the control circuit is connected to the input of a buffer circuit which drives the base of the switching transistor to turn the switching transistor on and off in response to the control circuit output. A control conductor may be connected to the outputs of the control circuits of a plurality of like switching regulator circuits to "wire OR" the output voltages of the control circuits. This ensures that the switching transistors of all of the interconnected switching regulators are turned off and on simultaneously at the same time, thereby uniformly loading each of the switching regulators in proportion to their rated power output capacities.

DESCRIPTION OF THE INVENTION

The invention provides a switching regulator which, when connected in parallel with like or similar switching regulators, shares the output power equally with equally rated switching regulators or in proper proportion to the capacity of unequally rated regulators. FIG. 1 shows the basic elements of a switching regulator, including a switch 13, an inductor 15, a capacitor 18, a diode 17 (commonly referred to as a "free-wheeling diode"), reference and comparator circuitry 20, and switch drive circuitry 25. An unregulated input voltage $V_{in}$ is applied to node 11. (The terms "node" and "conductor" are used interchangeably herein to designate a junction point of a conductor joining two circuit elements or the conductor itself, in accordance with common useage in the art of these terms.) Assuming that switch 13 is initially on, $V_{in}$ causes a large current to flow through inductor 15, causing the voltage at node 14 to rapidly rise toward $V_{in}$, thereby saturating switch 13. The current through inductor 15 charges capacitor 18, causing $V_{out}$ to rise. As $V_{out}$ rises, increasing amounts of output current flow into load 28. As the voltage at node 16 continues to rise, it attains a first threshold voltage of reference and comparator circuitry 20. This condition is detected by comparator circuitry, which produces a signal which causes switch drive circuitry 25 to turn switch 13 off. As will subsequently be explained with reference to FIG. 2, the signal on node 23 which drives switch drive circuitry 25 may be "wire ORed" with signals from comparators of other like switching regulators to provide simultaneous switching of the switches 13 of all such switching regulators. With switch 13 off, the current which continues to flow in inductor 15 causes the voltage at node 14 to drop sharply, thereby turning on free-wheeling diode 17. The reduced voltage of node 14 establishes a second threshold voltage of reference and comparator circuit 20. The current through load 28 eventually exceeds the current through inductor 15; this condition causes $V_{out}$ to fall; when $V_{out}$ falls below the second threshold voltage, the comparator again switches, causing switch drive circuit 25 to turn switch 13 back on. The voltage at node 14 again increases rapidly, again causing switch 13 to saturate, and causing the first threshold voltage to be reestablished in reference in comparator circuit 20. $V_{out}$ begins increasing. The operation repeats at a cycle frequency determined mainly by the values of inductor 15, capacitor 18, and difference between $V_{in}$ and $V_{out}$.

Figure 2:
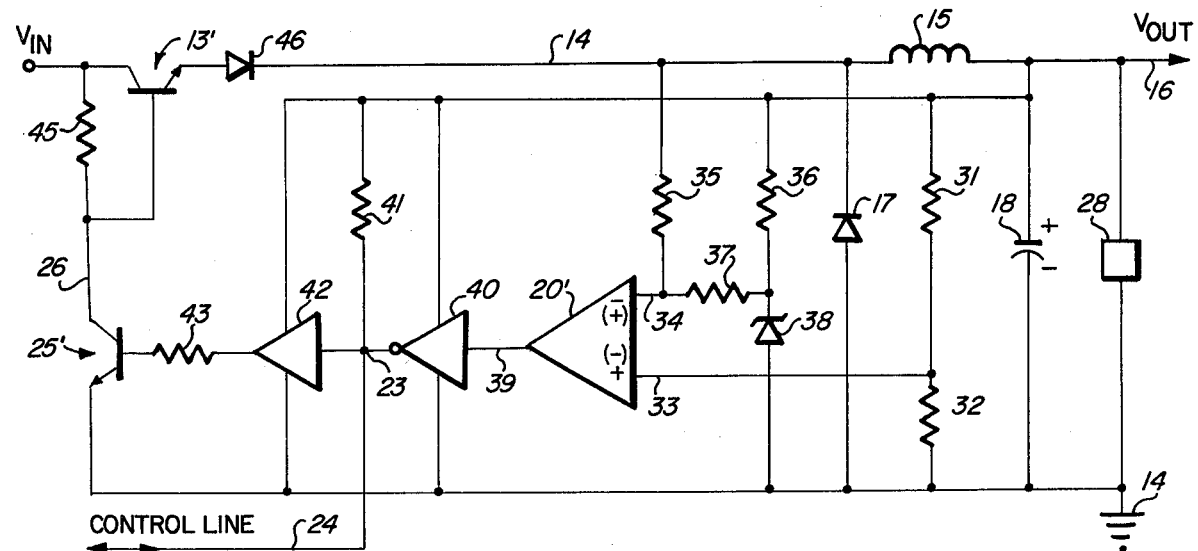

The detailed structure and operation of switching regulator 10 are now described. Referring to FIG. 2, wherein parts similar or identical to parts of FIG. 1 are indicated by similar or identical reference numerals, unregulated input voltage $V_{in}$ is applied to the collector of switch transistor 13', which has its emitter coupled to node 14 by means of protective diode 46. Resistor 45 connects the collector and base of switch transistor 13', and provides current to turn switch transistor 13' on when transistor 25' is off. Inductor 15, capacitor 18, and load 28 are connected the same as in FIG. 1. Diode 46 prevents emitter-base reverse breakdown due to charge stored on capacitor 18 if $V_{in}$ is suddenly reduced to ground potential; this is necessary because the emitter-base reverse breakdown voltage is quite low (on the order of six volts) for most conventional bipolar transistors. Reference and comparator circuit 20 of FIG. 1 includes comparator 20', inverter 40, a voltage divider including resistors 31 and 32, the reference voltage circuit including resistor 36 and zener diode 38, and hysteresis network including resistors 35 and 37. Switch drive circuit 25 of FIG. 1 includes buffer circuit 42, resistor 43, and transistor 25'. The operation of the circuitry of FIG. 2 is as follows.

Assuming that switch transistor 13' is initially turned on by current through resistor 45. $V_{out}$ almost instantly rises to a level sufficient to cause saturation of switch transistor 13'. The current flowing through inductor 15, increases, supplying increasing current to load 28 and to capacitor 18. $V_{out}$ increases as a result of capacitor 18 being charged, and reaches a level such that the output voltage divider 31, 32, applied at comparator input 33, exceeds a first threshold voltage applied to comparator input 34 by the hysteresis network 35, 37 and reference circuit 36, 38. The first threshold voltage is equal to the voltage of zener diode 38 plus the voltage produced by the voltage divider action of resistors 35 and 37.

When the voltage at non-inverting input 33 exceeds the first threshold voltage at inverting input 34, comparator circuit 20' switches, so that the voltage at output node 39 goes from a high level to a low level, thereby turning off an input transistor (not shown) of inverter 40. Comparator 20' may be a National Semiconductor model LM311 comparator. Inverter 40 is an open collector or an open drain logic inverter.

An open collector inverter is a bipolar transistor inverter which has no "pull-up" transistor to charge the output to a logical "1" level when a logical zero is applied to an input transistor of the open collector inverter. Similarly, an open drain inverter (or non-inverting buffer circuit) is one in which a drain of a field effect transistor is coupled to the output, wherein no pull up device internal to the inverter is provided to produce a logical "1" level at the output in response to an input signal. The "1" level for open collector or open drain inverters or buffers must therefore be established by an external "pull-up" device, such as resistor 41. Both open collector and open drain buffer circuits or inverter circuits are referred to as open-output circuits. Such circuits are readily available commercially. For example, inverter 40 may be an open collector TTL (transistor-transistor logic) inverter such as the Texas Instruments model 7406. As an alternative, inverter 40 may be replaced by an open drain non-inverting CMOS (complementary metal oxide semiconductor) buffer circuit, such as the National Semiconductor model MM74C906. Or, an open source circuit, such as the National MM74C907 could be used to accomplish a logical ORing function. In the latter two cases, the inverting and non-inverting inputs of comparator 20' must be reversed to produce the proper signal at node 23; the interchanged connections to the comparator inputs are indicated by the parenthesis in the symbol for comparator 20' in FIG. 2.

When comparator 20' switches and turns off the input switch of inverter 40, pull-up resistor 41 pulls the voltage at node 23 to logical "1" level of $V_{out}$ volts. (The voltage of node 23 may be transmitted on control conductor 24 to control conductors of other switching regulators coupled in parallel with switching regulator 10, as explained hereinafter with reference to FIG. 3). Output of buffer circuit 42 is driven by the signal at node 23, and provides a base drive current to transistor 25' in response to the logical "1" on control line 24. The resulting collector current produced by transistor 25' discharges the base of switch transistor 13' to near ground potential, thereby turning off switching transistor 13'.

The current through inductor 15 necessarily continues to flow, thereby rapidly reducing the voltage of node 14 below ground potential, thereby turning on free-wheeling diode 17 and continuing to deliver current through free-wheeling diode 17 to load 28 and capacitor 18. The reduced voltage at node 14 establishes a second threshold voltage at inverting input 34 of comparator 20', the second threshold voltage being lower than the reverse voltage of zener diode 38. The second threshold voltage is equal to the zener diode voltage minus the voltage produced by the voltage divider action of resistors 35 and 37. (Resistors 35 and 37 determine the amount of hysteresis of the circuit including comparator 20' and its positive feedback loop including inverter 40, buffer 42, transistors 25' and 13', and resistor 35. The hysteresis voltage determines, inpart, the magnitude and frequency of the "ripple" voltage associated with $V_{out}$). The resistance of resistor 35 is ordinarily selected to be much larger than the resistance of resistor 37 to keep the hysteresis voltage and hence the "ripple" voltage small.

The magnitude of the current through inductor 15 gradually decreases until it equals the current through load 28. $V_{out}$ begins to decay, and falls until the voltage at input 33 of comparator 20' is less than the second threshold voltage at inverting input 34. Comparator 20' then switches again, so that the voltage at node 39 goes high, thereby turning on the input transistor of open collector inverter 40. This causes the voltage at node 23 to fall to near ground potential, thereby causing transistor 25' to be turned off. Node 26 is rapidly charged to $V_{in}$ volts by resistor 45, turning on switching transistor 13' and thereby charging up node 14 and again saturating switch transistor 13'. Consequently, the first threshold voltage is again established at non-inverting input 34 of comparator 20'. The foregoing cycle is repeated at a "ripple" frequency determined mainly by the hysteresis voltage, the difference between $V_{in}$ and $V_{out}$ and the values of inductor 15 and capacitor 18. Typical values for resistors 35 and 37 are 220 Kilohms and 1 Kilohm respectively; a typical value for resistor 36 is 1 Kilohm; a typical inductance for inductor 15 is 200 microhenrys; and a typical capacitance for capacitor 18 is 100 microfarads.

Figure 3:
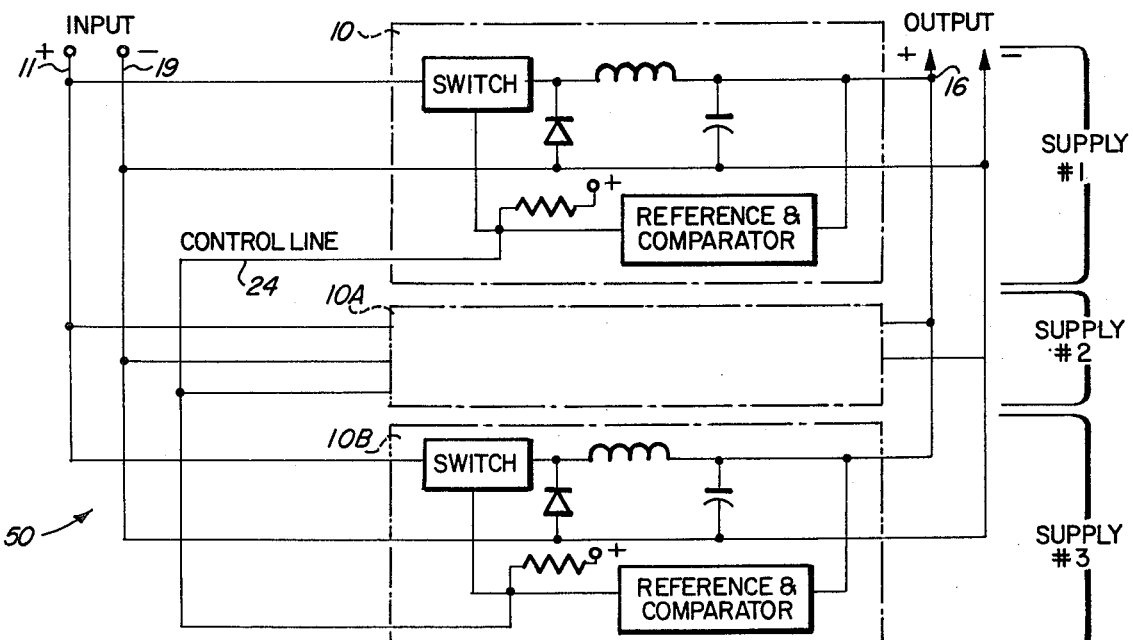

FIG. 3 illustrates the manner in which a plurality of the switching regulators identical or similar to the one of FIGS. 1 and 2 may be connected in parallel so that the power dissipation is shared between the switching regulators according to their capacities. Referring to FIG. 3, a plurality of such switching regulators are connected in parallel so that $V_{in}$ is applied between input node 11 and ground node 19 of each of the switching regulators, and all of the output nodes 16 are also connected together to produce a single regulated voltage $V_{out}$. All of the control conductors 24 are also connected together. The open collector or open drain configuration of the circuits 40, in combination with the pull-up resistors 41, produces a "wired OR" function on the control bus such that the logical NOR of all of the comparator output signals appears on the common control conductor 24. (The term "wired OR function" is used herein to encompass both logical OR function and a logical NOR function accomplished by wiring open outputs together. The term "logical ORing" is also intended to cover producing both logical OR and logical NOR functions.) The "wired OR" function produced at the control buses indicated by the dotted OR circuit 22 of FIG. 1. The operation of the parallel connected switching regulators 10, 10A, 10B of FIG. 3 is such that all of the switching transistors 13' are essentially simultaneously turned on and off in response to the "wired OR" signal on the common control bus 24. For example, if all of the switching transistors 13' are on, control bus 24 is held low, near ground potential, until the switching regulator having the highest "stand alone" output voltage (due to normal manufacturing tolerances) "releases" control bus 24 when $V_{out}$ is sufficiently high to cause comparator 20' of that switching regulator to switch. In other words, $V_{out}$ keeps increasing until all of the comparators 20' have switched except the comparator of the regulator having the highest "stand alone" output voltage. Consequently, the input transistor of the inverter 40 of that regulator is still on, thereby holding the output bus 24 low and maintaining the transistors 25' of all of the regulators off, so that all of the switching transistors 13' remain on. When $V_{out}$ increases by an additional amount sufficient to cause the remaining comparator 20' to switch, the last inverter will turn off, and the pull-up resistors 41 will increase the voltage of the control bus 24, which will turn on all of the transistors 25', thereby simultaneously turning off all of the switching transistors 13'. As $V_{out}$ subsequently decreases, all of the switching transistors 13' will remain off until the comparator of one of the switching regulators switches. This will result in all of the switching transistors 13' being simultaneously turned on. Consequently, the load current is automatically and uniformly distributed according to the capacity of all of the parallel connected switching regulators.

It should be noted that if a logical OR signal, rather than a logical NOR signal, is produced on control conductor 24, the operation of the parallel connected combination of switching regulators is somewhat different than described above. Essentially, the difference is that when the output voltage is charged to a level which exceeds the upper threshold voltage of the amplifier having the lowest stand-alone upper threshold the signal produced on control conductor 24 turns off all of the switching transistors of the switching regulators coupled in parallel. As the regulated output voltage is discharged to a level lower than the lower threshold voltage of the error amplifier having the lowest lower threshold, the signal on the control conductor will turn on all of the switching transistors of the parallel coupled switching regulators.

The above principles refer equally well to other types of switching regulators, such as those referred to as "boost" and "fly-back" type switching regulators in "The Importance of Rectifyer Characteristics In Switching Power Supply Design", Publication No U-73, by Unitrode Corporation, Watertown, Massachusetts. The control conductor 24 and the "wired OR" circuitry of the present invention may be readily incorporated in the above additional types of switching regulators to control the base electrodes of the switching transistors thereof in the same manner as in the switching regulators in FIGS. 1-3. The operation of parallel connected combinations of these types of switching regulators is completely analogous to the operation of the parallel connected switching regulators of FIG. 3.

The invention provides circuitry and technique for providing uniform loading or loading proportionate to current producing capacity of switching regulators which are coupled in parallel configuration to produce increased power capacity and a regulated output voltage by controlling the duty cycles of all of the parallel connected switching regulators. The invention avoids the problems associated with the various known techniques and circuitry for achieving uniform distribution of the load amount linear voltage regulators connected in parallel configuration. For example, the necessity of readjusting current and voltage limits of the various individual parallel-connected regulators in order to compensate for variations in the load or to compensate for connection of additional regulators is avoided by the invention. In contrast, the regulating system and method of the invention permit wide ranges in the loading of the system, varying from the no load condition to the full load condition, with no readjustment of the regulator system whatsoever. Further, any number of additional individual switching regulators may be connected in parallel with no readjustment of the system. Automatic and uniform balancing of the loading among the parallel connected switching regulators according to the current producing capacity of each is automatically accomplished by the circuitry of the present invention.

We claim:

1. A switching regulator having a switching transistor, an inductor, and input, and an output for producing a regulated output voltage at the output in response to an unregulated input voltage applied to the input, said switching regulator comprising in combination:
   (a) comparator means responsive to the regulated output voltage for producing a first signal indicative of whether the regulated output voltage exceeds a predetermined voltage level;
   (b) first means coupled to a first node and to said comparator means for producing a first logical level at the first node if the first signal is at a first voltage and for presenting an open circuit impedance to the first node if the first signal is at a second voltage;
   (c) second means coupled to the first node for producing a second logical level at the first node if an open circuit impedance is presented to the first node;
   (d) a control conductor coupled to the first node for conducting the voltage of the first node, whereby the voltage of the first node may be coupled to corresponding first nodes of other switching regulators coupled in parallel with said switching regulator in order to effect uniform loading of said switching regulator and the other switching regulators; and
   (e) third means coupled to said first means and to the base of said switching transistor for turning said switching transistor on when the first node is at the first logical level and for turning said switching transistor off when the first node is at the second logical level.

2. The switching regulator of claim 1 further including a reference voltage conductor and a free-wheeling diode coupled between said inductor and said reference voltage conductor for conducting the current in said inductor when said switching transistor is off.

3. The switching regulator of claim 2 further including a capacitor coupled between said reference voltage conductor and the output of the switching regulator for cooperating with said inductor to integrate the voltage at a junction between said inductive means and said switching transistor.

4. The switching regulator of claim 3 wherein said comparator means includes error amplifier means having a first input and a second input.

5. The switching regulator of claim 4 further including reference means coupled between the reference voltage conductor and the output of said switching regulator for producing a reference voltage at the first input of said error amplifier means.

6. The switching regulator of claim 5 further including means for coupling a portion of the regulated output voltage to the second input of said error amplifier means, wherebyy said error amplifier means amplifies the voltage difference between the reference voltage and the portion of the regulated output voltage.

7. The switching regulator of claim 6 wherein the first input of said error amplifier means is a non-inverting input and wherein the second input of said error amplifier means is an inverting input.

8. The switching regulator of claim 6 wherein said first input of said error amplifier means is an inverting input, and wherein said second input of said error amplifier means is a non-inverting input.

9. The switching regulator of claim 6 wherein said coupling means includes a voltage divider network coupled between the output of the switching regulator and said reference voltage conductor for producing the portion of the regulated output voltage and coupling said portion of the regulated output voltage to the second input of said error amplifier means.

10. The switching regulator of claim 5 wherein said reference means includes a reference voltage circuit for producing a constant reference voltage at a second node, a first resistor connected between the second node and the first input of said error amplifier means, and a second resistor coupled between the first input of said error amplifier means and the output of the switching regulator.

11. The switching regulator of claim 6 wherein said second means includes an open collector buffer circuit, the output of said open collector buffer being coupled to said second means.

12. The switching regulator of claim 6 wherein said third means includes buffer circuit means responsive to the voltage of the first node and coupled to the base of said switching transistor for turning said switching transistor on and off in response to the voltage of the first node.

13. The switching regulator of claim 12 wherein said buffer circuit means includes a non-inverting buffer and a second transistor, said non-inverting buffer having its input coupled to the first node and its output coupled to the base of said second transistor, said second transistor having its emitter coupled to the reference voltage conductor and its collector coupled to the base electrode of said switching transistor.

14. The switching regulator of claim 13 further including a resistor coupled between the base and collector electrodes of said switching transistor.

15. The switching regulator of claim 12 wherein said buffer circuit means includes an inverting buffer and a second transistor, said inverting buffer having its input coupled to the first node and its output coupled to the base of said second transistor, said second transistor having its emitter coupled to the reference voltage conductor and its collector coupled to the base of said switching transistor, wherein the first input of said error amplifier means is an inverting input and said second input of said error amplifier means is a non-inverting input.

16. A switching regulator system having an output and an input for producing a regulated output voltage at the output in response to an unregulated input voltage applied to the input, said switching regulator system comprising in combination:
 (a) a plurality of switching regulators, each of the switching regulators including a switching transistor, an inductor responsive to the switching transistor for supplying current to the output of the switching regulator, a free-wheeling diode responsive to the inductor, and comparator means responsive to the regulated output voltage for producing an output signal representative of whether the regulated output voltage exceeds a threshold of the comparator;
 (b) control means responsive to each of the comparator means for producing a control signal which is equivalent to the logical NOR function of the output signals of all of the comparator means; and
 (c) first means coupled to said control means and to the base electrodes of each of said switching transistors for turning said switching transistors on and off simultaneously in response to said control signal, thereby producing substantially uniform currents in the conductors of each of said switching regulators.

17. The switching regulator system of claim 16 wherein said control means includes:
 (a) a plurality of open-output buffer circuits, one located in each of said switching regulators, the input of each open-output inverter being coupled to the output of the corresponding comparator means;
 (b) a control conductor coupled to the outputs of each of the open-output inverters; and
 (c) charging means coupled to said control conductor for charging said control conductor to a predetermined voltage when an open-output impedance is presented to said control conductor by all of said open-output inverters.

18. The switching regulator system of claim 17 wherein said first means includes a buffer circuit located in each of the individual switching regulators, said buffer circuit having an input coupled to said control conductor and an output providing drive current for the base electrodes of said respective switching transistors.

19. A method of operating a plurality of switching regulators in parallel to achieve loading of the switching regulators each in proportion to its designed power output capacity, each of the switching regulators including a switching transistor for controlling the regulated output voltage and an error amplifier for detecting whether the output voltage exceeds a threshold voltage of the switching regulator; the invention comprising the steps of:
- (a) detecting whether the output voltage exceeds a threshold voltage of each of the error amplifiers, thereby causing each of the error amplifiers to produce an output signal indicative of the results of the detecting;
- (b) producing a control signal by logically ORing the error amplifier output signals; and
- (c) turning all of the switching transistors off or on in response to the control signal.

20. A method of operating a plurality of switching regulator circuits in parallel to produce a regulated output voltage in response to an unregulated input voltage and to maintain uniform loading of each of the switching regulator circuits according to the respective current producing capacity of each, each of the switching regulator circuits including an error amplifier means responsive to the output voltage, control circuitry responsive to the error amplifier, and a switching transistor responsive to the control circuit for increasing the regulated output voltage, and a common control conductor coupled to the control circuitry of each switching regulator, each of the error amplifier means having an upper threshold voltage and a lower threshold voltage, the method comprising the steps of:
- (a) charging the output voltage to a level which exceeds the upper threshold of the amplifier means having the highest threshold voltage;
- (b) turning off all of the switching transistors in response to the first state of the amplifier means having the highest upper threshold voltage;
- (c) discharging the regulated output voltage to a level lower than the lower threshold voltage of the error amplifier having the highest lower threshold voltage, thereby causing the error amplifier having the highest lower threshold voltage to switch to a second state; and
- (d) turning all of the switching transistors on in response to the second state of the error amplifier having the highest lower threshold voltage.

21. A method of operating a plurality of switching regulator circuits in parallel to produce a regulated output voltage in response to an unregulated input voltage and to maintain uniform loading of each of the switching regulator circuits according to the respective current producing capacity of each, each of the switching regulator circuits including an error amplifier means responsive to the output voltage, control circuitry responsive to the error amplifier, and a switching transistor responsive to the control circuit for increasing the regulated output voltage, and a common control conductor coupled to the control circuitry of each switching regulator, each of the error amplifier means having an upper threshold voltage and a lower threshold voltage, the method comprising the steps of:
- (a) charging the output voltage to a level which exceeds the upper threshold of the amplifier means having the lowest threshold voltage;
- (b) turning off all of the switching transistors in response to the first state of the amplifier means having the lowest upper threshold voltage;
- (c) discharging the regulated output voltage to a level lower than the lower threshold voltage of the error amplifier having the lowest lower threshold voltage, thereby causing the error amplifier having the lowest lower threshold voltage to switch to a second state; and
- (d) turning all of the switching transistors on in response to the second state of the error amplifier having the lowest lower threshold voltage.

* * * * *